United States Patent [19]

Hirano et al.

[11] Patent Number: 5,028,495
[45] Date of Patent: Jul. 2, 1991

[54] COMPOSITE FOIL BRAZING MATERIAL AND METHOD OF USING

[75] Inventors: Kenji Hirano, Suita; Minoru Suenaga, Ibaraki; Masaaki Ishio, Osaka, all of Japan

[73] Assignee: Sumitomo Special Metal Co., Ltd., Osaka, Japan

[21] Appl. No.: 540,873

[22] Filed: Jun. 20, 1990

Related U.S. Application Data

[62] Division of Ser. No. 463,124, Jan. 10, 1990, abandoned.

[30] Foreign Application Priority Data

Jan. 11, 1989 [JP] Japan ................................ 1-1993[U]
Jan. 11, 1989 [JP] Japan ................................ 1-1994[U]

[51] Int. Cl.⁵ ...................... B32B 15/04; B23K 35/28
[52] U.S. Cl. .................... 426/622; 428/615; 428/632; 228/263.21
[58] Field of Search ............ 428/607, 660, 621, 622, 428/627, 632, 633, 673, 680, 925, 926; 228/263.21, 121, 122

[56] References Cited

U.S. PATENT DOCUMENTS

| | | | |
|---|---|---|---|
| 3,652,237 | 3/1972 | Mizuhara | 428/660 |
| 3,813,258 | 5/1974 | Pieper et al. | 428/660 |
| 3,854,194 | 12/1974 | Woodward | 428/660 |
| 4,024,479 | 6/1977 | Parker | 428/660 |
| 4,034,454 | 12/1977 | Galasso et al. | 428/660 |
| 4,448,853 | 5/1984 | Fischer et al. | 428/607 |
| 4,562,121 | 12/1985 | Thiemann et al. | 428/607 |
| 4,624,897 | 11/1986 | Ito | 428/660 |
| 4,725,509 | 2/1988 | Ryan | 428/607 |
| 4,780,374 | 10/1988 | Mizuhara | 428/607 |

Primary Examiner—John J. Zimmerman
Attorney, Agent, or Firm—Watson, Cole, Grindle & Watson

[57] ABSTRACT

A composite foil brazing material for joining ceramics to each other or to metal, which is made up of a core of Ti and outer layers of Ni or Ni alloy containing less than 80% of Cu, with the core and the composite foil having the respective sectional areas whose ratio is 5/10 to 9/10.

20 Claims, 1 Drawing Sheet

COMPOSITE FOIL BRAZING MATERIAL AND METHOD OF USING

CROSS REFERENCE TO RELATED APPLICATION

This application is a divisional of application Ser. No. 463,124, filed Jan. 10, 1990, now abandoned.

BACKGROUND OF THE INVENTION

1. Field of the Invention

The present invention relates to a brazing material in the form of a composite foil which is used for joining ceramics to each other or to metal. The composite foil is made up of a core of Ti and outer layers of Ni or an Ni alloy containing a specific amount of Cu. This brazing material is suitable for joining oxide ceramics to each other or to a highly wettable metal having a coefficient of thermal expansion close to that of ceramics, or to a Kovar alloy or a Cu composite material. It provides good workability and high bond strength.

2. Description of the Prior Art

According to the conventional technology for ceramics packaging, the joining of ceramics to each other is accomplished by the steps of metallizing the surfaces facing each other with a metal such as Mo, W, and Mo-Mn, which is highly wettable and has a coefficient of thermal expansion close to that of ceramics, plating the metallized surface with Ni, and Ag soldering. This joining method, however, needs much time and high cost in metallizing, Ni plating, and Ag soldering, and presents difficulties in joining ceramics plates having irregularly shaped surfaces.

The joining of ceramics to metal is also accomplished in the same method as mentioned above. In addition to this method, a variety of joining methods have been developed so far. They include, for example, the high-melting metal method and the active metal method. Unfortunately, they need complex steps and strict environment controls and hence lead to high production cost.

Prior arts relating to this technology are disclosed in U.K. Patent No. 761045 and Japanese Patent Laid-Open No. 37914/1977. According to the former disclosure, Cu is placed on a substrate and heated to a temperature higher than the melting point of Cu and lower than the melting point of cuprous oxide so that Cu oxide is formed on Cu. Joining is accomplished by the reaction of the substrate with a eutectic of Cu oxide and molten Cu. According to the latter disclosure, joining is accomplished by forming between ceramics and metal a eutectic alloy whose major component is the metal to be joined to ceramics. To be more specific, the joining of Fe to ceramics is accomplished by heating to as high as 1523° C. which is the eutectic point of Fe and oxygen. In this case, oxygen functions as a binder. Moreover, the joining of Cu to ceramics is accomplished by heating to a temperature higher than the eutectic point (1065° C.) of Cu and oxygen and lower than the melting point (1083° C.) of Cu.

These joining methods have some disadvantages. That is, the range of heating temperature is narrow, heating up to a high temperature (1523° C.) is necessary for the joining of Fe to ceramics, and the joining operation needs many steps and hence costs much.

SUMMARY OF THE INVENTION

It is an object of the present invention to provide a brazing material which is used to join ceramics to each other or to metal easily with a high bond strength at a low cost.

In order to reduce the cost of and to improve the efficiency of joining ceramics to each other or to metal in the production of ceramics packages, the present inventors carried out a series of researches on a brazing material in the form of foil which is expected to be easy to handle. As the result, it was found that the object is achieved with a composite foil brazing material which is made up of a core of Ti and outer layers of Ni or an Ni alloy containing a specific amount of Cu, with the outer layers being cold cladded by rolling to the core such that a specific ratio is established between the sectional areas of the core and the composite foil. This composite foil exhibits outstanding brazing performance although it is low in price. The present invention was completed on the basis of this finding.

The gist of the present invention resides in a composite foil brazing material for joining ceramics to each other or to metal, which is made up of a core of Ti and outer layers of Ni or Ni alloy containing less than 80% of Cu, with the core and the composite foil having the respective sectional areas whose ratio is 5/10 to 9/10.

The composite foil brazing material of the present invention is suitable for joining an article of oxide ceramics such as $Al_2O_3$ and $ZrO_2$ to another ceramic article having good wettability and a coefficient of thermal expansion close to that of the oxide ceramics. Unlike the conventional Ag solder, it obviates the preliminary step of metallizing the ceramics and yet provides a high bond strength. It is also suitable for joining an article of oxide ceramics such as $Al_2O_3$ and $ZrO_2$ to an article of metal (such as Ti, Mo, W, and Cu), alloy (such as Cu-W, Kovar, and 42% Ni-Fe alloy), or composite material (composed of Kovar and Cu or 42% Ni-Fe alloy and Cu), having good wettability and a coefficient of thermal expansion close to that of the oxide ceramics. It provides a high bond strength.

DETAILED DESCRIPTION OF THE INVENTION

Figure 1:
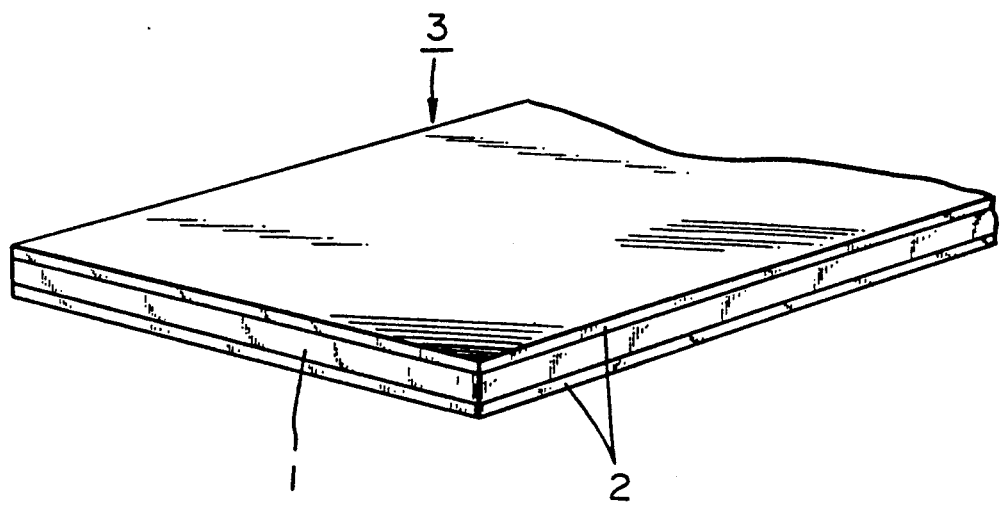
FIG. 1 is a perspective view illustrating the composite foil brazing material of the present invention.

As shown in FIG. 1, the composite foil brazing material 3 of the present invention includes a core 1 and outer layers 2 on opposite sides of the core. The core 1 is made of Ti because Ti forms a eutectic structure with Ni or an Ni-Cu alloy, of which the outer layers 2 are made, thereby imparting a high bond strength and corrosion resistance to a joint 3 formed between two substrates 4 and 5 (see FIG. 2) and also improving the wettability of the substrate, at the time of joining ceramics to each other or to metal.

The composite foil brazing material of the present invention has outer layers of Ni because Ni lowers the melting point of Ti and protects the core (Ti) from environment gas during heat treatment. Ni may be replaced by an Ni alloy containing less than 80 wt % of Cu without any change in its effect. Any Ni alloy containing more than 80 wt % of Cu does not lower the melting point of Ti but deteriorates the corrosion resistance. The preferred composition of the alloy is 30-75% Cu and 25-70% Ni (by weight).

According to the present invention the core and the composite foil have the respective sectional areas whose ratio is 5/10 to 9/10. With a ratio less than 5/10, the amount of Ti in the core is so little that the brazing material does not wet ceramics very well. With a ratio more than 9/10, the amount of Ni or Ni alloy in the outer layers is too little to lower the melting point of Ti sufficiently. The preferred ratio is 7/10 to 9/10.

The composite foil brazing material of the present invention is produced according to the following method. A coil of Ti sheet and two coils of Ni (or Ni alloy) sheet are uncoiled such that the Ti sheet is sandwiched by the two Ni sheets. The three sheets are cold cladded by rolling into a three-layered clad sheet. The clad sheet subsequently undergoes annealing and cold rolling repeatedly until the desired ratio of the sectional areas is obtained. The configuration of the cross section is not specifically limited; but a rectangular cross section is preferable. The outer layers on the core may be of the same material or different materials.

The composite foil brazing material of the present invention should preferably have a thickness in the range of 30 to 150 μm so that it easily conforms to the shape of the substrate to be joined, providing good joining performance workability.

When coated with Ag the composite foil brazing material of the present invention exhibits improved wettability for ceramics. The preferred thickness of Ag coating is 1 to 5 m.

EXAMPLE 1

A three-layered clad sheet was formed continuously by cold cladding at a reduction ratio of 60% from a Ti sheet, 1.2 mm thickness and 250 mm width, and two 65% Ni-35% Cu alloy sheets, 0.15 mm thickness and 250 mm width, which were supplied from uncoiled rolls. The clad sheet underwent annealing at 850° C. for 2 minutes and rolling at a reduction ratio of 50%. The clad sheet further underwent annealing and rolling repeatedly. Thus there was obtained a composite foil brazing material made up of a core of Ti, 0.08 mm thickness and 250 mm width, and two outer layers of Ni-Cu alloy, 0.01 mm thickness each and 250 mm width, having a rectangular cross section as shown in FIG. 1.

Figure 2:
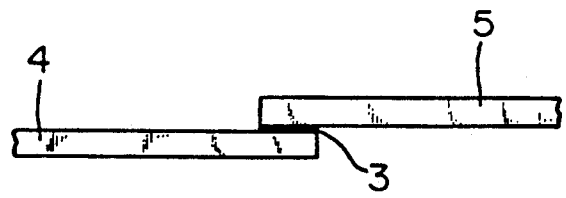
FIG. 2 is a schematic diagram showing the shear strength test of the specimen.

From this composite foil brazing material was taken a specimen, which was interposed between two pieces of $Al_2O_3$ or $ZrO_2$ ceramic plate, measuring 50 mm length, 10 mm width, and 1.0 mm thickness, as shown in FIG. 2. By heating at 950° C. for 5 minutes in argon gas, the ceramic plates were joined to each other. The joined ceramic plates were tested for shear strength by pulling in the opposite directions as shown in FIG. 2. The results are shown in Table 1.

For comparison, the same ceramic plates as mentioned above, which had been metallized with W, were joined to each other with Ag solder by heating at 850° C. for 5 minutes in hydrogen gas. The shear strength test was conducted in the same method as mentioned above. The results are shown in Table 1.

TABLE 1

|  | Brazing material | Ceramics joined | Shear strength (kg/mm²) |
|---|---|---|---|
| Example 1 | Composite foil: Ti core clad with Ni—Cu alloy | $Al_2O_3$ to $Al_2O_3$, without metallizing | 13.4 |
|  |  | $ZrO_2$ to $ZrO_2$, without metallizing | 14.5 |
| Comparative Example | Silver solder (85 Ag—Cu) | $Al_2O_3$ to $Al_2O_3$, with metallizing | 9.8 |
|  |  | $ZrO_2$ to $ZrO_2$, with metallizing | 10.1 |

EXAMPLE 2

From the same composite foil brazing material as in Example 1 was taken a test piece, which was interposed between an $Al_2O_3$ ceramic plate, measuring 50 mm length, 10 mm width, and 10 mm thickness, and a Mo plate, 42Ni-Fe alloy plate, or Kovar alloy plate, measuring 50 mm length, 10 mm width, and 0.5 mm thickness. Joining was achieved by heating at 950° C. for 5 minutes in argon gas. The joined plates were tested for shear strength by pulling them in the opposite directions. The results are shown in Table 2.

For comparison, the same $Al_2O_3$ ceramic plate as mentioned above, which had been metallized with W, was joined to a Kovar plate with Ag solder by heating at 850° C. for 5 minutes in hydrogen gas. The shear strength test was conducted in the same method as mentioned above. The results are shown in Table 2.

TABLE 2

|  | Brazing material | Ceramics joined | Metal joined | Shear strength (kg/mm²) |
|---|---|---|---|---|
| Example 2 | Composite foil: Ti core clad with Ni—Cu alloy | $Al_2O_3$ without metallizing | Kovar alloy | 9.3 |
|  |  |  | 42 Ni—Fe alloy | 9.8 |
|  |  |  | Mo | 11.4 |
| Comparative Example | Silver solder (85 Ag—Cu) | $Al_2O_3$ with metallizing | Kovar alloy | 8.5 |

EXAMPLE 3

The $Al_2O_3$ ceramics plates joined with the composite foil brazing material in Example 1 were tested for shear strength at room temperature, 300° C., 400° C., 500° C., and 600° C. The results are shown in Table 3.

TABLE 3

| Test temperature | Room temperature | 300° C. | 400° C. | 500° C. | 600° C. |
|---|---|---|---|---|---|
| Shear strength | 13.4 kg/mm² | 12.1 kg/mm² | 9.3 kg/mm² | 8.5 kg/mm² | 8.3 kg/mm² |

EXAMPLE 4

The same specimen as used in Example 3 was tested for shear strength after cyclic heating and cooling, each cycle consisting of heating at 500° C. for 15 minutes and air-cooling for 15 minutes. The number of cycles was 50, 100, or 150. The results are shown in Table 4.

TABLE 4

| 0 cycles | 50 cycles | 100 cycles | 150 cycles |
| --- | --- | --- | --- |
| 13.4 kg/mm² | 13.2 kg/mm² | 13.7 kg/mm² | 12.8 kg/mm² |

EXAMPLE 5

The same specimen as used in Example 3 was tested for shear strength after heating at 300° C., 400° C., 500° C., or 600° C. for 1 hour, followed by cooling at room temperature. The results are shown in Table 5.

TABLE 5

| No heating | 300° C. | 400° C. | 500° C. | 600° C. |
| --- | --- | --- | --- | --- |
| 13.4 kg/mm² | 13.0 kg/mm² | 12.5 kg/mm² | 13.3 kg/mm² | 12.0 kg/mm² |

EXAMPLE 6

The composite foil brazing material obtained in Example 1 was tested for corrosion resistance according to the JIS test method. No rust occurred on the specimen even after salt spraying for 100 hours.

It is noted from the results in Examples that the composite foil brazing material of the present invention is suitable for joining ceramics to each other or to metal. Unlike the conventional one, it obviates metallizing and works at a temperature less than 950° C. It is easy to handle and provides high bond strength. Moreover, being composite foil, it easily conforms to any complex shape of the surface of the object to be joined.

What is claimed is:

1. A joined composite article comprising two ceramic substrates and a composite foil brazing material located between associated areas of said ceramic substrates, said composite foil brazing material comprising a core of Ti and outer layers of an Ni-containing alloy, the composite foil brazing material having been cold cladded and annealed by diffusion.

2. A composite article as claimed in claim 1, wherein the core and the composite foil have respective sectional areas whose ratio is 5/10 to 9/10.

3. A composite article as claimed in claim 2, wherein the ratio of sectional areas is 7/10 to 9/10.

4. A joined composite article as claimed in claim 1, wherein the outer layers of the composite foil are made of Ni alloy composed of Cu 30-75 wt % and Ni 25-70 wt %.

5. A composite article as claimed in claim 1, wherein the composite foil has a thickness of 30 to 150 μm.

6. A composite article as claimed in claim 1, wherein the composite foil has layers of Ag on the Ni-containing outer layers thereof.

7. A composite article as claimed in claim 6, wherein the Ag coating layers have a thickness of 1 to 5 um.

8. A composite article as claimed in claim 1, wherein the ceramic substrates are made of oxides selected from the group consisting of $Al_2O_3$ and $ZrO_2$.

9. A joined composite article comprising a ceramic substrate, a metallic substrate and a composite foil brazing material located between associated areas of said substrates, said composite foil brazing material comprising a core of Ti and outer layers of an Ni-containing alloy, the composite foil brazing material having been cold cladded and annealed by diffusion.

10. A composite article as claimed in claim 9, wherein the ceramic substrate is made of an oxide selected from the group consisting of $Al_2O_3$ and $ZrO_2$ and the metal substrate is made of a member selected from the group consisting of Ti, Mo, W, Cu, Cu-W alloy, Kovar alloy (28-33% Ni, 14-19% Co, balance Fe), 35 to 50% Ni-Fe alloy, composite material (clad material) of Kovar alloy and Cu, and composite material (clad material) of 35 to 50% Ni-Fe alloy and Cu.

11. A composite article as claimed in claim 9, wherein the core and the composite foil have respective sectional areas whose ratio is 5/10 to 9/10.

12. A composite article as claimed in claim 11, wherein the ratio of sectional areas is 7/10 to 9/10.

13. A composite article as claimed in claim 9, wherein the outer layers of the composite foil are made of Ni alloy composed of Cu 30-75 wt % and Ni 25-70 wt %.

14. A composite article as claimed in claim 9, wherein the composite foil has a thickness of 30 to 250 um.

15. A composite article as claimed in claim 9, wherein the composite foil has layers of Ag on the Ni-containing outer layers thereof.

16. A composite article as claimed in claim 15, wherein the Ag coating layers have a thickness of 1 to 5 um.

17. A method of utilizing a composite foil which comprises a core of Ti and outer layers of an Ni-containing alloy and which has been annealed by diffusion subsequent to cold cladding so as to join two ceramic substances, said method comprising the steps of:
   (1) providing two oxide ceramic substances to be joined,
   (2) providing a composite foil which comprises a core of Ti and outer layers of an Ni-containing allow, the composite foil having been annealed by diffusion after cold cladding,
   (3) positioning the composite foil between associated areas of said two ceramic substrates to be joined, and
   (4) heating the associated areas of said two ceramic substrates and the composite foil therebetween to join said two ceramic substances together.

18. The method of use as claimed in claim 17, wherein in step (3) said associated areas of said two substrates and the composite foil therebetween are heated to 950° C. for five minutes in an atmosphere of argon gas.

19. A method of utilizing a composite foil which comprises a core of Ti and outer layers of an Ni-containing alloy and which has been annealed by diffusion subsequent to cold cladding so as to join a ceramic substrate to a metal substrate, said method comprising the steps of:
   (1) providing an oxide ceramic substrate and a metallic substrate to be joined,
   (2) providing a composite foil which comprises a core of Ti and outer layers of an Ni- containing alloy, the composite foil having been annealed by diffusion after cold cladding,
   (3) positioning the composite foil between associated areas of said ceramic and metal substrates to be joined, and
   (4) heating the associated areas of said ceramic and metal substrates and the composite foil therebetween to join said ceramic substrate to said metal substrate.

20. The method of use as claimed in claim 19, wherein in step (4) said associated areas of said ceramic and metal substrates and the composite foil therebetween are heated to 950° C. for five minutes in an atmosphere of argon gas.

* * * * *